United States Patent [19]

Kaplan et al.

[11] 3,965,535

[45] June 29, 1976

[54] POULTRY LEG BONING MACHINE

[75] Inventors: John J. Kaplan, Council Bluffs, Iowa; Wilhelm H. Richert, Bellingham, Mass.; John W. Trumblee, Council Bluffs, Iowa

[73] Assignee: Jo-Bi Farms, Inc., Council Bluffs, Iowa

[22] Filed: Oct. 17, 1974

[21] Appl. No.: 515,669

[52] U.S. Cl. .................................. 17/1 G; 17/11; 17/46
[51] Int. Cl.² ............................................ A22B 17/04
[58] Field of Search ................ 17/11, 1 G, 46, 44, 17/52

[56] References Cited
UNITED STATES PATENTS

| | | | |
|---|---|---|---|
| 2,897,536 | 8/1959 | Bergstrom | 17/46 |
| 2,932,060 | 4/1960 | Massengill | 17/46 |
| 3,058,149 | 10/1962 | Schmid et al. | 17/1 G |
| 3,233,282 | 2/1966 | Segur | 17/46 |
| 3,456,284 | 7/1969 | Werner et al. | 17/46 |
| 3,533,128 | 10/1970 | Brown et al. | 17/46 |
| 3,581,337 | 6/1971 | Tonjum et al. | 17/46 |

*Primary Examiner*—Louis G. Mancene
*Assistant Examiner*—James D. Hamilton
*Attorney, Agent, or Firm*—Lowe, Kokjer, Kircher

[57] ABSTRACT

A machine for stripping the meat of precooked poultry legs from the connected leg and thigh bones. The legs are loaded on a horizontal auger conveyor and conveyed to a vertical chain conveyor which carries the legs longitudinally upwardly through a meat stripping mechanism. The stripping mechanism includes two horizontal discs rotating with their closely spaced peripheral stripping edges in opposition to engagingly strip the meat downwardly from the upwardly moving legs. A third horizontal disc rotating with its peripheral edge behind and slightly below the two opposed stripping edges assists in the stripping operation. The opposed stripping edges of the discs include cooperating recesses through which the knuckle joints and enlarged end joints of the legs freely pass. After being stripped, the bones are ejected from the chain conveyor by a rotating ejection rod.

12 Claims, 11 Drawing Figures

POULTRY LEG BONING MACHINE

BACKGROUND AND SUMMARY OF THE INVENTION

In the processing of poultry meat, whole poultry carcasses are first thoroughly cooked until the meat is tender. After cooking, the carcasses are broken up into separate pieces including legs, wings, breasts, and backs, and the meat of the separate pieces is thereafter removed from the bones for further processing. The instant invention is concerned with the removal of the meat from poultry legs after the legs have been detached from the carcasses.

After the poultry carcasses have been cooked intact, the legs are detached therefrom with the leg and thigh bone usually remaining connected together. In separating the meat from the connected legs and thighs, the process most commonly used at present is a manual one wherein the meat is torn from the bones by hand. The excessive time consumed and the high labor costs involved in this manual separation process add substantially to the overall cost of the final product. Moreover, a substantial amount of meat is invariably left clinging to the bone, regardless of the skill with which the manual process is performed. It is also common for fragments of the gristle that covers the knuckle joint between the leg and thigh bones to be removed along with the meat, which considerably reduces the quality and value of the end product. The quality of the meat and the efficiency of the overall process is even further reduced because the meat is torn from the bone in relatively small pieces which are extremely difficult to process into sliced or diced form.

Although machines have been devised for automatically removing meat from poultry leg bones, these machines have proven deficient in several important aspects. Most existing machines operate too slowly to handle the large volume of legs required for efficient performance. The machines that operate at higher speeds fail to remove all of the meat from the bone and thereby waste a substantial amount of useful meat. Also, the quality of the meat is poor because of the undesirable material that is contained therein due to the failure of existing machines to cleanly separate the meat without also removing bone fragments, gristle, tendons and ligaments therewith. A further undesirable characteristic of prior art machines is their tendency to tear the meat into a number of small pieces. As mentioned above, the fragmentation of the poultry meat severely impairs the further treatment thereof and increases the cost of the final product accordingly.

The difficulty and time required to disassemble and reassemble existing machines for inspection, repair, and replacement of parts has presented another major problem. Due to rigid quality requirements, such maintenance work must be performed frequently and carefully with respect to machines that process food. Also, in view of the high standards of cleanliness involved in food processing, it is necessary to regularly and thoroughly wash the operating components in order to maintain the machine in the required sanitary condition. Since access to the components of prior art machines is impaired, the machines must be frequently shut down for extended time periods to permit adequate cleaning. Consequently, the maintenance costs and inefficiency are still further increased.

As a result of the foregoing drawbacks in the prior art, there remains a need in the poultry processing industry for a machine to rapidly, effectively, and cleanly remove precooked meat from poultry legs. It is the primary goal of the present invention to fulfill that need.

More specifically, an object of this invention is to provide a machine for completely and rapidly removing the meat from precooked poultry leg bones.

Another object of the invention is to provide a machine of the character described which removes the meat from connected leg and thigh bones in a single piece.

Still another object of the invention is to provide a machine of the character described in which the operating components are readily accessible for quick and easy cleaning, maintenance, and disassembly.

Yet another object of the invention is to provide a machine of the character described in which neither bone fragments nor any portion of the gristle covering the knuckle joint is removed with the meat.

A further object of the invention is to provide, in a machine of the character described, a unique stripping mechanism to cleanly strip the meat from the bones of poultry legs.

A still further object of the invention is to provide a stripping mechanism of the character described in which scraper means is included for self cleaning purposes.

Another object of the invention is to provide a machine of the character described in which the components are ruggedly constructed for effective performance and a long operating life.

Still another object of the invention is to provide, in a machine of the character described, an improved conveyor for carrying the poultry legs through the stripping mechanism at selected time intervals.

Yet another object of this invention is to provide, in a machine of the character described, a unique conveyor for transporting the legs at the desired rate from an exterior loading station to the stripping mechanism.

A further object of this invention is to provide in a machine of the character described, a reliable means for disposing of the bones after they have been stripped of meat.

Other and further objects of the invention, together with the features of novelty appurtenant thereto, will appear in the course of the following description.

DETAILED DESCRIPTION OF THE INVENTION

In the accompanying drawings which form a part of the specification and are to be read in conjunction therewith, and in which like reference numerals are utilized to indicate like parts in the various views:

FIG. 5 is an enlarged, fragmentary, sectional view taken generally along line 5—5 of FIG. 1 in the direction of the arrows;

Figure 11:
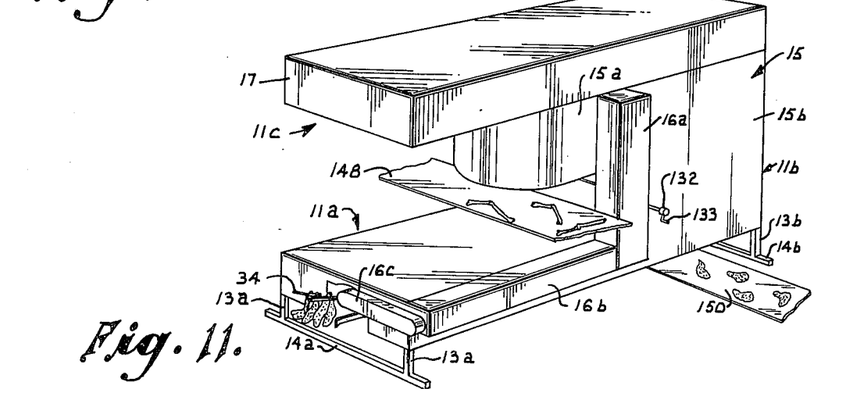
FIG. 11 is a reduced perspective view of the machine shown in FIG. 1 with the housing covering the components thereof.

Referring now to the drawings in detail, a poultry boning machine embodying the invention is generally designated by reference numeral 10. The various operative components of the machine are supported on a suitably constructed framework 11 which comprises a plurality of tubular structural members. The various structural members are interconnected in horizontal and vertical dispositions to form a frame structure that defines a low profile front portion 11a, a box-like rear portion 11b, and a roof 11c that overhangs forwardly of portion 11b. A plate 12 is secured in overlying relation to roof 11c to form a support thereon. A pair of short front legs 13a are interconnected at the bottom by a horizontal base member 14a, while a pair of short rear legs 13b are interconnected by a second horizontal base member 14b to provide a stable base integral with frame 11 upon which the frame stands. As best shown in FIG. 11, a paneling or housing 15 covers the structural members comprising frame 11 to completely enclose the operating components of the machine. Housing 15 consists of various panels supported on the frame structure and removable therefrom, including an open bottomed, curved panel 15a extending forwardly from frame portion 11b beneath the overhanging roof 11c and a pair of side panels 15b and 15c which form the opposite sides of the machine. Also, a plurality of guards 16a, 16b and 16c cover various exposed shafts and chains, and a rectangular hood 17 covers the components mounted on roof plate 12.

A horizontal conveyor comprises an elongate cylindrical auger 18 that is rotatably mounted longitudinally within front frame portion 11a to convey the poultry legs rearwardly from the front or loading portion of the machine. Formed in the surface of auger 18 is a groove 18a which spirals continuously around the auger at a selected angle throughout the entire length thereof and is of an appropriate size to receive the legs below their hock portions.

Figures 1, 3:
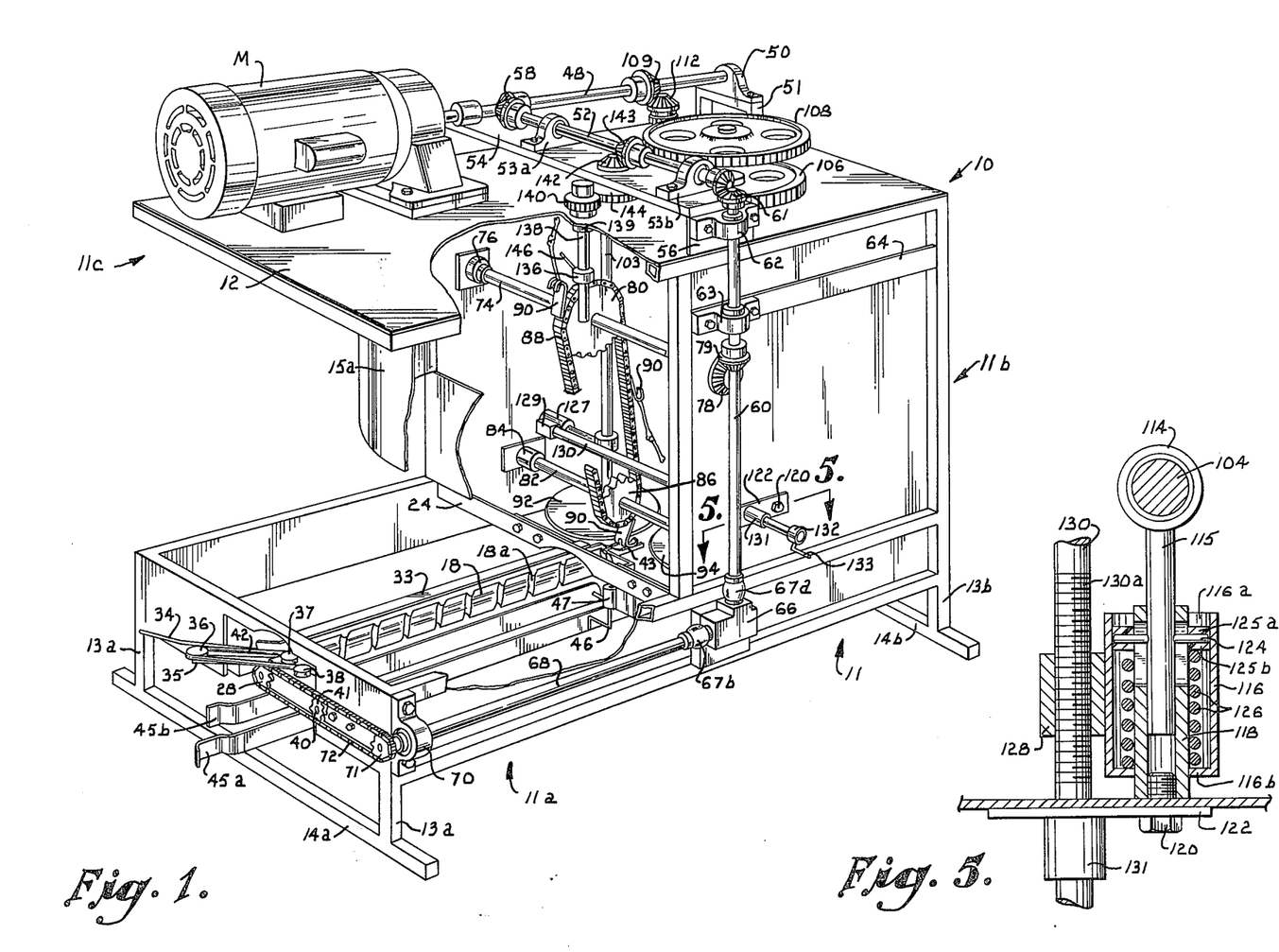
FIG. 1 is a perspective view from the front of a poultry leg boning machine embodying the invention, with portions of the housing broken away to illustrate the components therewithin.
FIG. 3 is a fragmentary perspective view of the auger conveyor taken from the rear thereof.

With reference particularly to FIG. 3, a bent front mounting bracket 19 is secured to a panel 20 which extends across the width of the forward end of the frame portion 11a. To permit lateral adjustability of bracket 19, a pair of bolts 21 are inserted through horizontal slots 22 in the bracket and threaded into panel 22. A similarly bent rear mounting bracket 23 is bolted to a cross member 24 on the rearward end of the front frame portion. Bracket 23 is horizontally slotted at 25 and is laterally adjustable relative to the frame by means of bolts 26 inserted through slots 25 and threaded into member 24. Auger 18 is rotatably pinned at 27 to rear bracket 23, while a short shaft (not shown) carrying a sprocket 28 at its forward end extends centrally from rigid connection to the forward end of the auger and is journaled for rotation in front bracket 19.

Another bent bracket 29 is mounted to one side of bracket 19 on panel 20 and is laterally adjustable thereon by means of a pair of horizontal slots 30a in the bracket and bolts 30b that extend through slots 30a and are threaded into panel 20. A second rear bracket 31 is mounted for lateral adjustment on cross member 24 to one side of bracket 23. Horizontal slots 32a and bolts 32b extending therethrough are utilized to secure bracket 31 to member 24. A substantially vertical panel 33 extends longitudinally between brackets 29 and 31 a short distance to one side of auger 18. Panel 33 includes a short horizontal top portion 33a that extends slightly above the auger. A fork-lift member or rod 34 projects forwardly and upwardly from the front end of panel 33 and includes an outwardly bent forward end to facilitate the receipt of poultry legs thereon. A rod 35 similarly projects forwardly and upwardly from the front end of bracket 19 in spaced relation beside 34. Rods 34 and 35 are of suitable length and spacing to support poultry legs thereon by the hock portions of the legs, while the front ends of the rods extend forwardly of the frame and housing to permit the loading of legs thereon.

To assist in moving poultry legs from the front ends of rods 34 and 35 to auger 18, a belt and pulley assembly is provided. An idler pulley 36 is rotatably mounted in a horizontal disposition to the front end of rod 35 while a second horizontal idler pulley 37 is rotatably mounted near the inward end of rod 35. Another horizontal pulley 38 is mounted for rotation to the top of bracket 19. A driven pulley 39 is supported in a vertical orientation on the rearward end of a shaft 40 that extends through panel 20 and is jounalled for rotation therein. The forward end of shaft 40 carries a sprocket 41 which is sized identically with sprocket 28 and located laterally thereof. An endless belt 42 is tightly trained around pulleys 36, 37, 38 and 39 with a portion of the belt extending adjacently along rod 35. Belt 42 is driven downwardly along rod 35 by later described power means to frictionally engage poultry legs loaded on rods 34 and 35 and thereby move the legs down the rods to the front end of auger 18.

The rearward end of panel 33 terminates in a rearwardly projecting prong 43, while an identical prong 44 extends rearwardly from bracket 31 in closely spaced relation to the side of prong 43. Prongs 43 and 44 include downwardly sloping portions that deliver poultry legs to the horizontal fingers that form the rearward portions of the prongs and are spaced to support a poultry leg therebetween by its hock. A pair of spaced, parallel guide bars 45a and 45b hang below auger 18 in spaced relation to guide the bottom portion of a poultry leg conveyed along the auger. Bars 45a and 45b are supported on the lower ends of a plurality of crank shaped rods that are together denoted by numeral 46. The upper end of each rod 46 is threaded into a small drum, which drums are designated generally by numeral 47. Each of the drums 47 is secured to one of the various supporting members near auger 18. Bars 45a and 45b are vertically adjustable by means of the threaded relationship between rods 46 and drums 47, while the crank shaped nature of rods 46 permits the lower ends of the rods to swing in order to adjust the horizontal position of bars 45a and 45b.

A conventional electric motor M drivingly rotates auger conveyor 18 and sprocket 41 of the belt and pulley assembly by means of a suitable drive linkage. As FIG. 1 illustrates, motor M is mounted on the forward portion of plate 12 and drives a rotary output shaft 48. The rearward end of output shaft 48 is supported in an elevated bearing 50 which is mounted on a bracket 51 extending upwardly from the roof. Another shaft 52, which is perpendicular to shaft 48, is supported for rotation in a pair of spaced bearings 53a and 53b mounted on an elevated platform 54. Platform 54 extends across the width of the frame roof and is supported at each end on brackets 56 mounted to roof plate 12. Output shaft 48 drives shaft 52 by means of bevel gearing 58 interconnecting the two, while shaft 52 in turn drives a vertical shaft 60 by means of mating bevel gears 61. Vertical shaft 60 is rotatably supported in a pair of bearings 62 and 63, one mounted to the side of bracket 56 and the other mounted to a brace 64 extending horizontally along the side of frame portion 11b. The lower end of shaft 60 enters a gear box 66 which is mounted to the side of the frame near the bottom thereof and provided with suitable bearings 67a and 67b. Within the gear box, a bevel gear (not shown) carried on the lower end of shaft 60 mates with another bevel gear (also not shown) carried on the rearward end of a horizontal shaft 68 that extends along the side of front frame portion 11a. The forward end of shaft 68 is supported in a bearing 70 mounted to the side of the frame near the front thereof. A sprocket 71 is carried on the forward end of shaft 68. Finally, an endless chain 72 is trained around sprocket 71 and the previously mentioned sprockets 28 and 41 to rotate auger 18 and drive the belt and pulley assembly.

A vertical conveyor comprises a chain and sprocket assembly mounted within the rear frame portion 11b near the rearward end of auger 18. With reference particularly to FIG. 1, a shaft 74 extends across the width of the frame and has its opposite ends supported in respective bearings 76 mounted at an intermediate height to the opposite side panels of frame portion 11b. One end of shaft 74 extends through the right hand frame panel and carries a bevel gear 78 which mates at a right angle with another bevel gear 79 carried on an intermediate portion of the driven vertical shaft 60 to provide rotational power to shaft 74. A large drive sprocket 80 is carried on shaft 74 at a central point along its length.

A stationary shaft 82 is mounted across the width of the frame at a location below and slightly to the rear of shaft 74 and directly above the extreme end of the prong fingers. The opposite ends of shaft 82 are supported in respective sleeves 84 mounted to the opposite frame panels, while a small sprocket 86 is mounted for rotation on the central portion of the shaft directly above the prong fingers. Although shaft 82 is located slightly rearwardly from shaft 74, the rearward edges of sprockets 86 and 80 are in vertical alignment due to the smaller diameter of sprocket 86.

Figures 2, 3, 4:
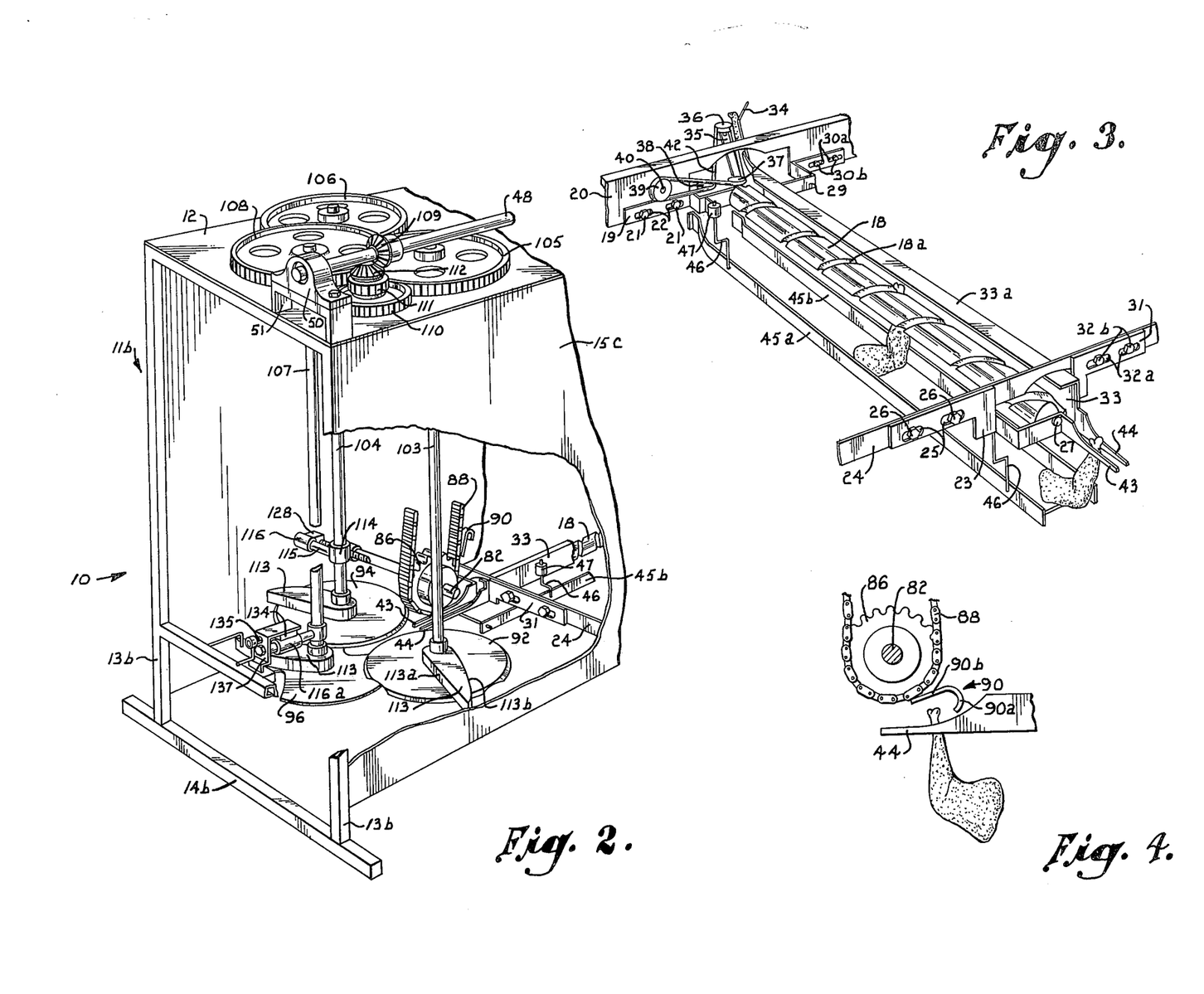
FIG. 2 is a fragmentary perspective view from the rear of the machine shown in FIG. 1, with portions of the housing broken away to illustrate the components therewithin.
FIG. 4 is a fragmentary, side elevational view at the discharge end of the auger conveyor.
Figure 6:
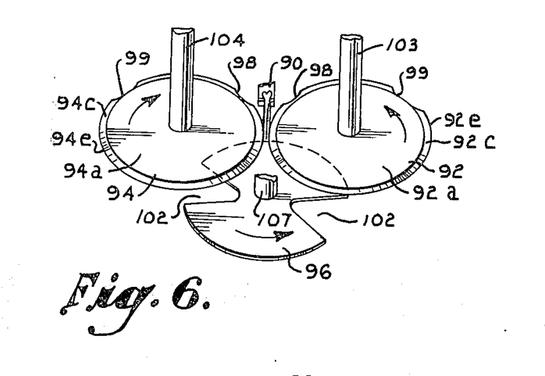
FIG. 6 is a fragmentary perspective view of the stripping mechanism, illustrating the upper portion of a poultry leg bone being stripped of its meat.

An endless chain 88 is trained around sprockets 80 and 86 with its rearward run moving in an upward direction. A plurality of leg carrying hooks 90 are rigidly connected to selected links of chain 88 and spaced an equal distance from one another along the length of the chain. Each hook 90 terminates in a pair of curved fork portions 90a extending from a shank or body 90b and separated by a slot within which a poultry leg may be received and carried at a point below its hock. As best illustrated in FIG. 4, when chain 88 is driven by the rotation of the driven sprocket 80, each hook 90 is intermittently carried adjacently past the spaced prongs 43 and 44 to receive a poultry leg from the finger portions thereof which are located a short distance below the lowermost portion of chain 88.

Figure 10:
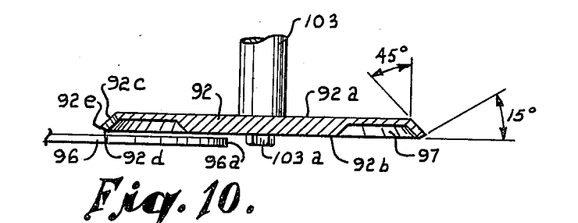
FIG. 10 is an enlarged, fragmentary, sectional view taken generally along line 10—10 of FIG. 9 in the direction of the arrows.

A stripping mechanism for removing meat from the poultry legs includes three rotary disc members 92, 94 and 96 mounted closely together near the bottom of rear frame portion 11b and operable to strip the meat from the poultry legs passed upwardly between their opposed edges. Referring now to FIG. 10, it is seen that disc 92, which is constructed similarly to disc 94, includes parallel, circular top and bottom faces 92a and 92b. A peripheral portion interconnecting the circumferences of the top and bototm faces is angled to present a peripheral surface 92c slanting outwardly and downwardly from top face 92a at an angle of approximately 45°. The small surface 92d forming the underside of the peripheral portion slopes outwardly and upwardly from bottom face 92b at an angle of approximately 15° from horizontal to present an outwardly disposed peripheral stripping edge 92e at its intersection with peripheral surface 92c. Disc 94 is constructed similarly, having top and bottom faces 94a and 94b and a downwardly angled peripheral surface 94c intersecting with a small upwardly angled surface to form a peripheral stripping edge 94e. With the aforementioned selection of angles, it is apparent that the stripping edges 92e and 94e are formed at a 60° angle by the intersection of the respective angled surfaces 92c and 92d and 94c and 94d. While in no way limiting the scope of the present invention, it has been found that discs having the described peripheral structure apply forces on a poultry leg in the manner and direction that most effectively strips the meat from the leg bone. Accordingly, it is preferred, but not required, that the stated angles be utilized in constructing the discs 92 and 94.

The bottom face of each disc 92 and 94 includes a beveled annular groove 97 adjacently inward of its peripheral portion. Each groove 97 presents a small chamber into which the leading portion of the meat enters as it is stripped from the bone. Since the leg is carried upwardly past and between the discs during the stripping process, the provision of the beveled grooves 97 reduces the severity of the directional change of the stripped meat and thereby facilitates the stripping operation.

Figure 7:
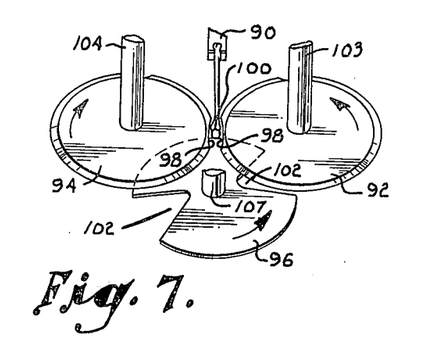
FIG. 7 is a fragmentary perspective view of the stripping mechanism, with the discs thereof having progressively rotated from the FIG. 6 position and with the knuckle joint of the poultry leg shown passing upwardly between the discs.
Figure 8:
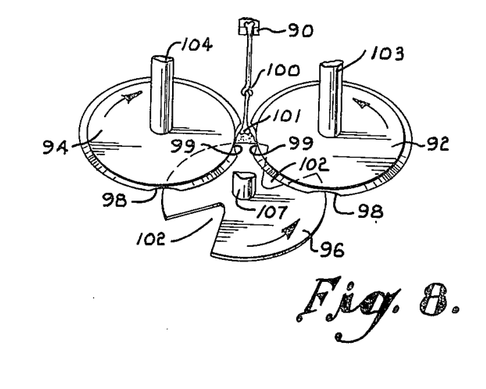
FIG. 8 is a fragmentary perspective view of the stripping mechanism, with the discs thereof having progressively rotated from the FIG. 7 position and with the enlarged end joint of a poultry leg shown passing upwardly between the discs.
Figure 9:
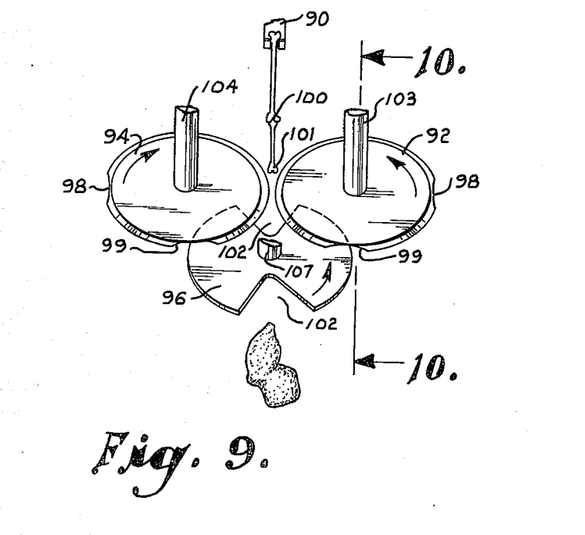
FIG. 9 is a fragmentary perspective view of the stripping mechanism, with the discs thereof having progressively rotated from the FIG. 8 position and with a poultry leg shown after having been completely stripped of its meat.

With reference now particularly to FIGS. 6–9, each disc 92 and 94 has a small curved notch or recessed portion 98 cut inwardly into its angled peripheral surface 92a or 94a. Each recess 98 is cut only partially through the angled peripheral surface, so that a somewhat sharp stripping edge follows the contour of recesses 98 along their inward portions. The respective recessed portions 98 are barely large enough to permit the knuckle joint 100 connecting the leg and high bones to pass therethrough when the recesses 98 are disposed in opposed relation, as in FIG. 7. A second and larger curved recess 99 is cut inwardly entirely through a portion of the angled peripheral surface of each disc 92 and 94. The recess 99 of each disc is spaced an equal distance from the first recess 98 at a trailing position with respect to the first recess. The recessed portions 99, when in the opposed relation of FIG. 8, present a space large enough to permit the end joint 101 of the leg bone to pass through.

The third disc 96 is thinner than discs 92 and 94 and has a blunt peripheral edge 96a interconnecting its circular top and bottom faces. A pair of V-shaped notches 102 are cut inwardly from the peripheral edge 96a into disc 96 at diametrically opposed positions with the vertices of the notches pointing toward the center of the disc. In the preferred embodiment, each notch 102 is cut approximately a 60° angle to provide a space large enough to accommodate the entire bulk of the meat of the poultry leg, which falls therethrough after having been stripped from the bone in one or more large pieces.

The three discs are mounted for rotation within frame portion 11b, discs 92 and 94 being carrier centrally (as by the bolt 103a shown in FIG. 10) on the lower ends of respective vertical shafts 103 and 104. Each shaft 103 and 104 is supported by a suitable bearing (not shown) mounted on roof plate 12 for limited lateral yieldability, the purpose of which will be described later. Shafts 103 and 104 are spaced laterally so that discs 92 and 94 are positioned side by side in a horizontal plane with their respective peripheries opposing one another a short distance apart. The space between the opposed peripheral portions is directly to the rear of and slightly below the rearwardly extending prongs 43 and 44, while the rearward run of chain 88 is located directly above the opposed peripheral portions. The top end of shaft 103 extends through the roof and is connected to a large toothed gear wheel 105, while shaft 104 is likewise connected at its top end to a gear wheel 106, the teeth of which mesh with the teeth of the adjacent gear 105.

In a similar manner, disc 96 is centrally mounted to the lower end of a vertical shaft 107 which is supported in a yieldable bearing mounted on the roof plate 12 and connected at its top end to a large gear wheel 108 spaced above wheels 105 and 106 in a partially overlying position with respect thereto. Shaft 107 extends downwardly directly behind the space between the opposed peripheral portions of discs 92 and 94, while the front portion of the disc 96 carried at its bottom end underlies the other two discs, extending forwardly to a position directly behind and slightly below the opposed peripheral portions of the other two discs.

The output shaft 48 of motor M rotatably drives the gear wheels 105, 106 and 108 and the connected shafts and discs by means of a bevel gear 109 carried near its rearward end. Referring now to FIGS. 1 and 2, a gear assembly comprising three gears 110, 111 and 112 is mounted for rotation on the rear portion of the frame roof below output shaft 48. The gear assembly includes the large spur gear 110 adjacent the roof, the smaller diameter spur gear 111 spaced upwardly therefrom, and the elevated bevel gear 112 which mates with the bevel gear 109 carried on the output shaft to drive gears 111 and 112. The teeth of spur gear 111 mesh with the teeth of the adjacent gear wheel 108 to rotate the connected disc 96. Similarly, spur gear 110 drives the adjacent gear wheel 105, which in turn mates with and drives gear wheel 106. The gear arrangement is such that discs 92 and 94 are driven in opposite rotational directions at the same speed, whereas disc 96 is rotated at half the speed of the other two discs due to the smaller gear 111 driving it.

Loosely mounted to each shaft 103, 104 and 107 adjacently above the disc carried thereon is a scraping member 113 (FIG. 2) for removing any meat particles or other debris that may accumulate on the top faces of the discs. Each scraper 113 has flat top and bottom surfaces, a flat vertical scraping face 113a, and a curved backside 113b. The scraping face 113a of each scraper is oriented to face in opposition to the motion of the underlying disc which slides beneath the flat bottom surface of the scraper, while the outer end of the backside 113b engages the adjacent frame panel to retain the scraper in a relatively fixed position so as not to move with the underlying disc.

The three shafts 103, 104 and 107 are mounted in a resilient manner such that they are yieldable outwardly toward the frame in response to sufficient outward force exerted on the respective discs carried thereon. The resilient mounting of shaft 104 will be described in detail, it being understood that a similar structure is provided for the other two shafts. With reference particularly to FIG. 5, it is seen that a bearing sleeve 114 circumscribes shaft 104 at an intermediate location above disc 94. A horizontal shaft 115 connected at its inward end to bearing sleeve 114 extends slidably through the inward end portion 116a of a spring loaded cylinder 116. The outward end of shaft 115 is slidably disposed in the bore of a cylindrical sleeve 118, the inward portion of which fits slidably into the spring loaded cylinder 116 through the opposite end 116b thereof. The sleeve 118 is mounted to the side panel of the frame by means of a screw 120 extended into a threaded portion of its bore through a mounting plate 122 secured to the frame panel. A pin 124 extends transversely through an aperture in an intermediate portion of shaft 115 and is engaged by washers 125a and 125b on either side. Washer 125a bears against the inward end portion 116a of the cylinder. A compression spring 126 is contained within cylinder 116 with one end engaging washer 125b and the other end surrounding sleeve 118 and bearing against the outer end 116b of the cylinder. It is thus apparent that the application of sufficient outward force on shaft 115 pushes pin 124 against the yieldable spring 126 to permit the shaft to slide outwardly, while the force of the spring tends to return the shaft to its stable position wherein pin 124 and the adjacent washer 125 bear against the end portion 116a of the sleeve.

Another spring loaded cylinder 127, similar to cylinder 116, resiliently connects shaft 103 to the opposite side of the frame. To provide a means for positionally adjusting the two cylinders 116 and 127 (and thus discs 94 and 92), respective blocks 128 and 129 having central threaded bores are connected (as by welding) to one side of the cylinders. A shaft 130 having external threads near each end (as at 130a) extends across the width of the frame and through the threaded bores of the opposite blocks 128 and 129. The external threads 130a near the opposite ends of shaft 130 run in opposite directions and the opposite blocks 128 and 129 also have oppositely disposed threads in their respective bores; that is, shaft 130 extends through the bore of block 128 in a right hand threaded connection, while the opposite end of the shaft extends through block 129 in a left hand threaded connection. Because of this reverse threading, the rotation of shaft 130 in one direction moves the opposite blocks 128 and 129 (and the connected discs 94 and 92) toward one another, whereas reversing the rotational direction of the shaft increases the separation of the blocks.

In order that shaft 130 may be rotated to adjust the lateral spacing of discs 92 and 94, one end of the shaft projects outwardly from the frame panel through a supporting sleeve 131 mounted to plate 122. A small ring 132 having a bent rod 133 threaded into an aperture in its side is fitted over the projecting end of shaft 130. The rod 133 may be threaded inwardly into engagement with the shaft to lock sleeve 132 thereon, and shaft 130 may then be rotated in either direction with the bent rod used as a handle.

As seen in FIG. 2, disc 96 is similarly mounted to the rear panel of frame portion of 11b, except that the block 134 connected to its spring loaded cylinder 116a is disposed above the cylinder and a short shaft 135 is utilized to threadingly adjust the inward and outward position of block 134. Block 134 and shaft 135 are supported on a bent bracket 137 that is secured to an adjacent frame member. It is noted that the aforementioned yieldably mounted bearings supporting shafts 103, 104 and 107 from roof plate 12 cooperate with the three spring loaded cylinders in permitting the lateral movement of the three discs.

A bone ejection mechanism is mounted near the top portion of conveyor chain 88 to eject the stripped bones from hooks 90. The mechanism includes a sleeve 136 (FIG. 1) carried intermediately on a short vertical shaft 138 positioned to one side of the large upper sprocket 80. Shaft 138 is rotatably mounted to roof plate 12 by a bearing 139 and includes a small spur gear 140 at its top end. A short shaft (not shown) is rotatably mounted to the roof and extends upwardly through the elevated platform 54. At its top end, above the platform, the shaft carries a bevel gear 142 which mates with another bevel gear 143 carried on the horizontal shaft 52. A spur gear 144 carried on the lower end of the short shaft is thereby driven in meshing engagement with gear 140 to rotate vertical shaft 138 and the connected sleeve 136. The rotation of shaft 138 is in timed relation with the movement of conveyor chain 88, so that each revolution of sleeve 136 causes a pin or rod 146 extending outwardly therefrom to be driven forcefully into engagement with a bone to eject the bone from the fork portions 90a on which it is carried.

Referring now to FIG. 11, an endless belt conveyor 148 is illustrated as passing beneath the open bottomed curved housing portion 15a and above the low profile front frame portion 11a to transport the stripped bones to a remote location. Also a second belt conveyor 150 passes beneath the stripping mechanism to carry away the stripped meat for further use. Conveyors 148 and 150 may be driven by any convenient means.

In operation, motor M is energized and poultry legs are successively loaded at any desired rate onto the protruding ends of the spaced rods 34 and 35, from which the legs hang downwardly by their hock portions. The downward slope of rods 34 and 35, in conjunction with the friction of belt 42, causes the legs to slide downwardly on the rods until, one at a time, they slide into a position between the front end of auger 18 and the adjacent panel 33. Each rotation of auger 18 causes the front end of its spiral groove 18a to revolve around, whereby the positioned leg is received in the groove slightly below its hock portion, becoming engaged in the groove on one side and against the front portion of side panel 33 on the other side. As the auger continues to rotate and thereby to move the adjacent groove portion 18a rearwardly, the poultry leg remains engaged between the panel and the moving spiral groove. The rearward movement of groove 18a thus slides the leg rearwardly along the length of side panel 33, with the spaced guide bars 45a and 45b opposing any tendency of the leg to twist as it is conveyed rearwardly. The upward force exerted on the legs due to the rotation of auger 18 is counteracted by the overhanging top portion 33a of the panel 33, which engages the top end of the leg to push it downwardly and retain the leg in position within groove 118a.

When each leg has been conveyed to the rearward end of auger 18 in the described manner, it is discharged from the end of groove 18a onto the sloping portions of prongs 43 and 44. The leg then slides down the sloping prong portions to the spaced prong fingers from which it remains suspended by its hock until picked up by one of the leg carrying hooks 90.

As suggested previously, the hooks 90 are spaced evenly along the length of the driven chain 88 and are intermittently swept adjacently past the top surface of prongs 43 and 44 to receive the legs in the slots between forks 90a. The spacing of hooks 90, the angle of the spiral groove 18a, and the respective speeds of auger 18 and chain 88 are selected in a manner such that each leg is picked from the prong fingers by a hook before the next succeeding leg is delivered to the prongs by the auger.

After receiving a poultry leg, each hook 90 carries the meat portion of the leg upwardly between the opposed peripheral stripping edges 92e and 94e of discs 92 and 94 and in rearward engagement with the blunt peripheral edge 96a of disc 96. Because of the relative vertical positions of the discs and sprocket 86, the bottom surfaces of the curved hooked forks 90a are first carried near discs 92 and 94 at a position slightly above the top surfaces of the discs. As a result, the stripping edges 92e and 94e and the blunt edge 96a first engage the poultry leg below the bottom surfaces of the forks and slightly below the hock portion of the leg.

As the leg is drawn upwardly through the stripping mechanism, the stripping edges 92e and 94e pierce the leg directly below its hock and, in cooperation with the edge 96a, proceed to strip the meat downwardly from the bone. Since the three peripheral disc edges bear inwardly but yieldably against the leg bone, the meat is peeled cleanly from the upwardly moving bone. Because the peripheral edges of discs 92 and 94 both move rearwardly at their respective points of engagement with the poultry leg and thereby tend to push the leg to the rear, the positioning of disc 96 behind the other two discs retains the leg in the proper position, in continuous engagement with all three discs, during the stripping operation. Disc 96 also cooperates with the vertical rear run of chain 88 to maintain the leg in a vertical orientation as it is stripped by opposing any tendency of the leg to swing. The yieldable mounting of the discs provided by the spring loaded cylinders 116 and 116a permits the discs to closely follow the contour of the bone and to yield outwardly so as not to break or chip at their edges if they should engage the bone.

The timed relation between discs 92 and 94 and chain 88 is synchronized so that when the knuckle joint 100 of the leg reaches the plane of the discs, the respective recessed portions 98 oppose one another as shown in FIG. 7. Consequently, the knuckle joint is drawn through the small space provided by the opposed recesses. The knuckle joint and its surrounding gristle are thereby avoided by the disc edges, while the meat surrounding the joint is torn away by the opposed stripping edges disposed along the contour of the recesses.

The stripping edges resume their normal stripping action at a point directly below the knuckle, and the stripping continues until a point directly above the enlarged end joint 101 is reached. Again, discs 92 and 94 are timed to carry their recesses 99 into corresponding opposition (FIG. 8) to allow the end joint and its associated gristle to pass through the space thereby provided. Immediately after the end joint 101 has passed above the discs, the meat hanging downwardly therefrom is completely severed from the bone in one large piece by the portion of the stripping edges 92e and 94e adjacently trailing recesses 99. Simultaneously, one of the large notches 102 of disc 96 is carried into a position (FIG. 9) below the severed piece of meat, thereby providing a space for the meat to fall through. The stripped meat therefore drops onto the conveyor belt 150 located therebelow and is conveyed to a point of use.

Referring now to FIG. 1 it is seen that the stripped bone is carried upwardly along the rear run of chain 88 and over the top of the upper sprocket 80. Because of the rigid connection of each hook 90 to chain 88, the bone projects upwardly from the hook after having passed over sprocket 80. At this point, the rotating shaft 138 swings the ejector rod 146 around to forcefully engage the bone and propel it out of the slot between forks 90a. The force of rod 146 hurls the ejected bone against the curved panel 15a, from where it drops downwardly through the open bottom of the panel onto the belt conveyor 148 and is carried off.

Although the operation of the machine has been described for a stripping operation upon a connected leg and thigh bone, it should be apparent that the machine is equally useful in stripping the meat from a leg bone to which no thigh bone is attached.

It is noted that the lateral adjustment of the discs provided by the threaded shafts 130 and 135 permits the discs to be spaced appropriately in order to strip various sizes of legs and various types of poultry. The operative components of the machine can be driven at high speeds while still remaining in the synchronized relationship required for proper cooperation. The machine therefore has the capacity to strip poultry legs at an extremely rapid rate—up to 50 legs per minute, which is a marked improvement over the capacities of existing machines.

From the foregoing it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. Apparatus for removing meat from a cooked poultry leg having at least one enlarged joint, said apparatus comprising:
   a supporting frame;
   at least two rotary disc members being substantially circular to provide peripheral stripping edges for engagement with said leg to strip meat therefrom, said disc members being horizontally disposed in juxtaposition and in spaced apart position whereby said leg may be received between the adjacent stripping edges of said disc members, and each of said disc members including at least one peripheral recess in the stripping edge thereof such that when said disc members are rotatably positioned with said recesses in opposed confronting alignment the enlarged joint of said leg may be passed through the space presented between said recesses;
   bearing means supportingly mounting said disc members on said frame and yieldably biasing said disc members to said spaced apart position;
   a poultry leg conveyor mounted on said frame to receive and carry said leg longitudinally between the adjacent stripping edges in a direction substantially perpendicular to said disc members;
   first drive means coupled to said disc members for the rotative drive thereof; and
   second drive means coupled to said leg conveyor for operation thereof, said second drive means being synchronized with said first drive means whereby to move said enlarged joint of said poultry leg through said recesses when in confronting alignment.

2. Apparatus as set forth in claim 1, including a third rotary disc member having a substantially circular peripheral edge for engagement with said leg to assist in stripping the meat therefrom, said third disc member being rotatably supported on said frame and rotatively driven with said peripheral edge thereof moving in close operative proximity to the adjacent stripping edges of said first mentioned pair of disc members.

3. Apparatus as set forth in claim 2, wherein said third disc member includes at least one inwardly recessed portion at said peripheral edge thereof, said third disc member rotating in a manner to carry said recessed portion into a position to permit the meat of said leg to pass therethrough after having been stripped from the bone.

4. Apparatus as set forth in claim 1, wherein said leg has a second enlarged joint, each of said disc members including a second peripheral recess in the stripping edge thereof such that when said disc members are rotatively positioned with said second recesses in opposed confronting alignment the second enlarged joint of said leg may be passed through the space presented between said second recesses.

5. Apparatus as set forth in claim 1, including means for adjusting the spacing between the stripping edges of said disc members.

6. Apparatus as set forth in claim 1, including a scraper member associated with each of said discs, said scraper members being engageable with said discs to scrape material therefrom.

7. Apparatus as set forth in claim 1, including means for ejecting leg bones from said conveyor mechanism after said bones have been stripped of meat.

8. Apparatus as set forth in claim 1, wherein said conveyor mechanism includes a leg carrying element for receiving and carrying said leg between said closely spaced stripping edges, said apparatus including a rod member rotatively driven to eject leg bones from said element after said bones have been stripped of meat.

9. Apparatus as set forth in claim 1, including a loading station accessible exteriorly of said frame and a second conveyor supported for movement on said frame and operable to carry said leg from said loading station and to discharge said leg to said first mentioned conveyor mechanism.

10. Apparatus as set forth in claim 1, wherein said disc members include peripheral stripping edges formed by the intersection of a pair of surfaces at substantially 60°.

11. Apparatus as set forth in claim 10, wherein one of said surfaces is oriented at substantially 45° with respect to the direction of motion of said leg theretoward.

12. A method of removing meat from a cooked poultry leg having a pair of enlarged joints, said method comprising the steps of:
moving a pair of sharp meat stripping edges in closely spaced relation;
moving said leg generally longitudinally of its bone engagingly between said stripping edges in a direction substantially perpendicular to the direction of motion of said stripping edges; and
separating said stripping edges a distance at least equal to the size of said enlarged joints when the respective joints reach said stripping edges,
whereby said stripping edges strip the meat from said bone and said enlarged joints pass freely between said stripping edges.

* * * * *